(12) United States Patent
Klosowiak et al.

(10) Patent No.: US 7,405,384 B2
(45) Date of Patent: Jul. 29, 2008

(54) METHOD AND APPARATUS FOR INTENSITY CONTROL OF MULTIPLE LIGHT SOURCES USING SOURCE TIMING

(75) Inventors: Tomasz L. Klosowiak, Glenview, IL (US); Zili Li, Barrington, IL (US); Min-Xian M. Zhang, Inverness, IL (US)

(73) Assignee: Motorola, Inc., Schaumburg, IL (US)

( * ) Notice: Subject to any disclaimer, the term of this patent is extended or adjusted under 35 U.S.C. 154(b) by 163 days.

(21) Appl. No.: 11/275,204

(22) Filed: Dec. 19, 2005

(65) Prior Publication Data

US 2007/0138372 A1    Jun. 21, 2007

(51) Int. Cl.
*G01J 1/32* (2006.01)
(52) U.S. Cl. .................... 250/205; 347/236; 347/246
(58) Field of Classification Search ................. 250/205; 347/236, 239, 246; 348/744, 750; 353/30; 359/213; 395/107
See application file for complete search history.

(56) References Cited

U.S. PATENT DOCUMENTS

| | | | |
|---|---|---|---|
| 3,624,278 A * | 11/1971 | Heckscher | ................ 369/102 |
| 4,733,067 A * | 3/1988 | Oinoue et al. | ................ 250/216 |
| 5,115,305 A | 5/1992 | Baur et al. | |
| 5,822,501 A * | 10/1998 | Hattori | ................ 358/1.7 |
| 5,953,294 A * | 9/1999 | Choi | ................ 369/44.12 |
| 6,614,954 B2 * | 9/2003 | Huang et al. | ................ 385/18 |
| 2001/0055462 A1 | 12/2001 | Seibel | |
| 2003/0011751 A1 * | 1/2003 | Sakata et al. | ................ 353/30 |
| 2003/0044967 A1 * | 3/2003 | Heffelfinger et al. | ...... 435/287.2 |
| 2003/0058440 A1 * | 3/2003 | Scott et al. | ................ 356/318 |
| 2003/0117483 A1 * | 6/2003 | Ishikawa et al. | ............ 347/236 |
| 2004/0218643 A1 | 11/2004 | Wickman et al. | |
| 2005/0219674 A1 * | 10/2005 | Asai et al. | ................ 359/213 |
| 2005/0247683 A1 * | 11/2005 | Agarwal et al. | ........ 219/121.73 |
| 2005/0251692 A1 | 11/2005 | Motoyama et al. | |

* cited by examiner

*Primary Examiner*—Georgia Y. Epps
*Assistant Examiner*—Kevin Wyatt

(57) ABSTRACT

A method and apparatus for controlling light intensity from two or more light sources. A timing scheme is used to modulate the light sources. Light from the light sources is combined to form a beam and a photo-sensor senses the beam. In a time interval when only one of the light sources is activated, the signal from the photo-sensor is monitored and used in a feedback control circuit to control the active light source.

15 Claims, 5 Drawing Sheets

METHOD AND APPARATUS FOR INTENSITY CONTROL OF MULTIPLE LIGHT SOURCES USING SOURCE TIMING

CROSS REFERENCE TO RELATED APPLICATIONS

This application is related to co-pending application CML02735T, U.S. patent application No. 11/275,206 entitled Method and Apparatus for Intensity Control of Multiple Light Sources, which is filed even date herewith.

BACKGROUND

An ultra-compact projection display, called a micro-projector, can provide an image larger than the hosting projecting device dimension. Such displays have the potential to overcome the display size limitation on mobile devices and can be used to display documents and images, for example. The displays can also help to overcome the input interface size limitation on mobile devices by displaying virtual input devices, such as keyboards.

One technology used for micro-projection is laser scanning, in which red, green and blue laser beams are scanned across a surface to form a full color image.

It is known that an individual semi-conductor or solid-state laser requires dynamic intensity stability control, which is usually performed by monitoring the laser output with a photo-diode and using a feedback control loop to control the laser intensity.

When micro-projection is used in a mobile device, the environmental conditions, such as temperature, will be subject to large changes. These changes increase the need for intensity control.

In a full color micro-projector, the laser sources are very close together and some techniques used for feedback control of a single laser may be ineffective due to cross-talk between the lasers. For example, one prior approach is to monitor the main beam reflection in the system, either from the housing or from the lens, to provide a feedback signal. Another approach is to measure leakage from a back mirror of the laser cavity. However, this is not a direct measure of laser power and reduces laser efficiency. Neither of these approaches will work when multiple lasers are used, because they do not provide feedback for the individual lasers, or they result in increased overall size of the system.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION

Figure 1:
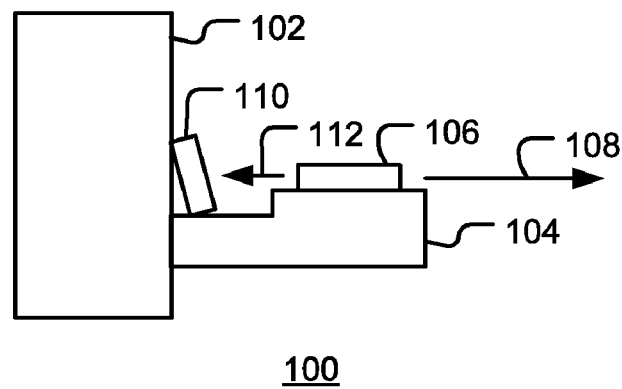
FIG. 1 is single laser with intensity control of the prior art.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

The present invention relates to intensity control in an illumination system employing multiple light sources. The invention is described with reference to an embodiment in a full color micro-projection system using laser light sources. However, other embodiments of the invention will be apparent to those of ordinary skill in the art.

FIG. 1 is single laser with intensity control of the prior art. The laser 100 includes a support structure 102, which is coupled to body 104 and supports semi-conductor laser element 106. The laser element emits light 108 in the forward direction. A photo-diode 110 collects light 112 that is emitted through a back mirror of laser element 106 or reflected by the metal case. This reduces efficiency because of leakage through the back mirror, and results in increased threshold current and decreased slope efficiency. Further, this approach will substantially increase the volume of the overall system with multiple lasers.

Figure 2:
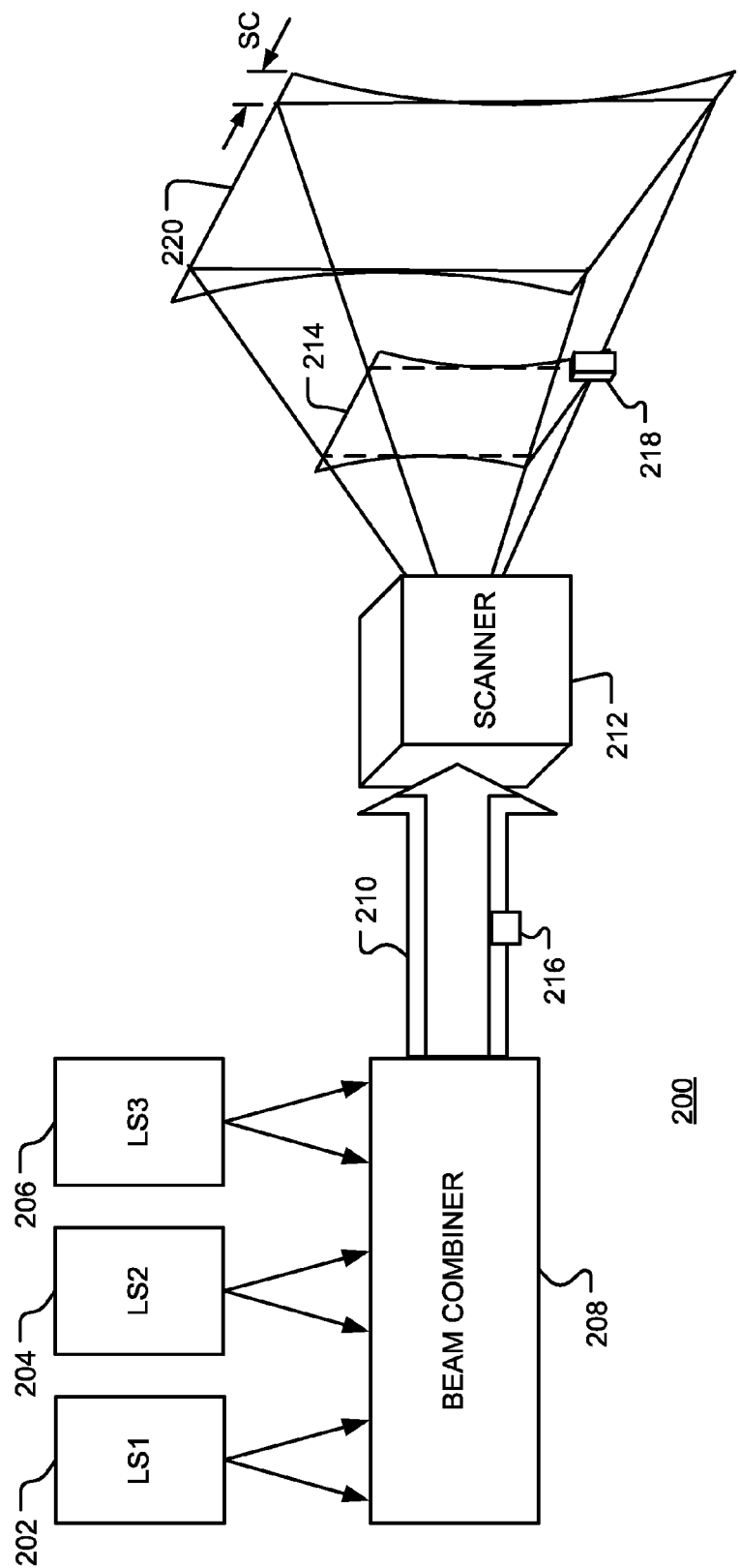
FIG. 2 is diagram of an illumination system with intensity control consistent with certain embodiments.

FIG. 2 is diagram of a multiple light source illumination system with intensity control consistent with certain embodiments of the present invention. Referring to FIG. 2, the system 200 includes at least three light sources (202, 204 and 206). These may be lasers, for example, each producing light at a primary color wavelength. For example lasers that generate light at 440 nm, 532 nm and 635 nm wavelengths may be used. Other combinations of lasers may be used. Some applications may require only two light sources, while other applications require three or more light sources. In some applications, the light sources are chosen so that a combination of the light from the sources can produce white light. Referring again to FIG. 2, the light sources (202, 204, 206) emit light uni-directionally in three separate beams. Light from the three separate beams is combined in beam combiner 208 to produce a single collimated beam 210. The collimated beam 210 is directed towards a 2-axis scanner 212 that scans the beam onto a screen 220. The light sources and scanner may be located inside projector such as a micro-projector. The scanned beam passes through a beam region 214 close to the scanner 212. The beam region 214 is inside the projector, while the screen 220 is outside of the projector. Various compact scanners are known to those of ordinary skill in the art.

A photo-sensor 216 (or a combination of photo-sensors) may be positioned before the scanner 212. Alternatively, a photo-sensor 218 (or a combination of photo-sensors) may be placed after the scanner 212. The photo-sensor 218 is located at the edge of the beam region 214.

Figure 3:
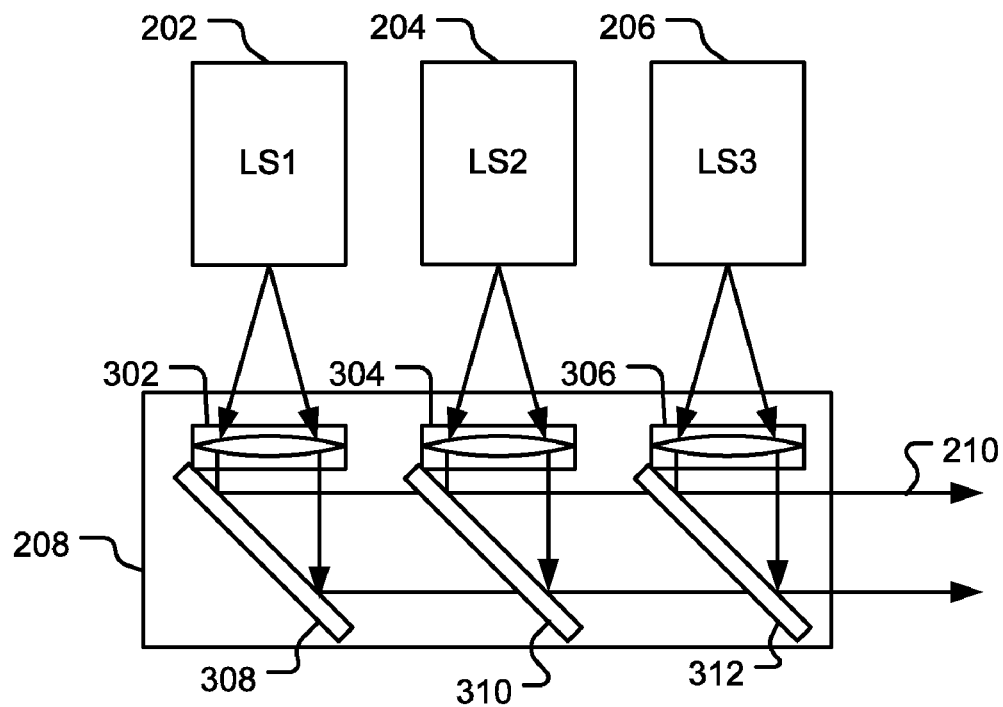
FIG. 3 is a diagram of a beam combiner consistent with certain embodiments.

An example beam combiner is shown in FIG. 3. The beams from light sources 202, 204 and 206 are passed through optical elements 302, 304 and 306 and are combined into a collimated and co-linear beam 210 using dichroic mirrors 308, 310 and 312. Each dichroic mirror reflects one primary color wavelength and transmits other wavelengths. Thus, for example, the dichroic mirror 310 reflects light from light source 204 but transmits light from light source 202. As used herein, the terms collimated and co-linear are meant to include instances of substantially collimated and co-linear beams.

Figure 4:
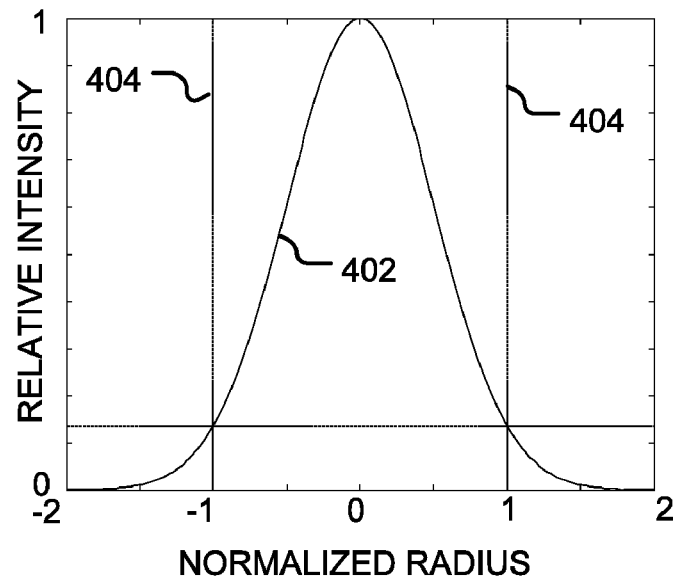
FIG. 4 is an exemplary plot of light intensity in a collimated beam.

Photo-sensor before scanner. The beam 210 has varying intensity in its cross section. In one embodiment, the beam 210 has a substantially Gaussian intensity profile. FIG. 4 is a plot 402 of the intensity of the collimated beam as a function of the normalized distance from the center of the beam. The intensity is plotted relative to the maximum intensity of the beam (which occurs at the center). The radius is normalized relative to the radius at which the intensity falls to $1/e^2$ of the maximum intensity. Only the central portion beam (for example, between lines 404 where the intensity is greater than 13.5% of the maximum intensity) is used for projection, so the photo-sensor 216 may be placed outside of the central region of beam, in the fringe of the beam, without shielding useful light. The photo-sensor 216 may be a single sensor that is sensitive to light from any of the light sources, or it may be a set of red, green and blue wavelength sensitive sensors.

For a Gaussian beam, 13.5% of the total energy of the beam intensity lies outside of the central beam with normalized radius R=1. Most of this energy is available for capture by one or more photo-sensors 216 in the fringe region.

Figure 5:
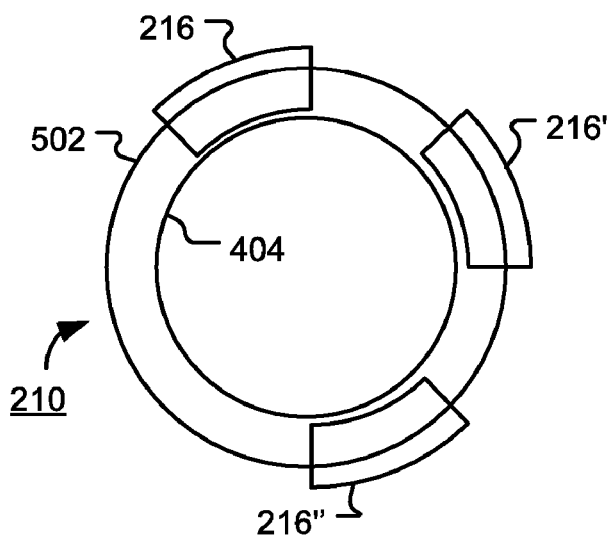
FIG. 5 shows photo-sensors located relative to a collimated beam consistent with certain embodiments.

FIG. 5 shows a cross section through the collimated beam 210. The beam has an inner region, inside the circle 404, in which the light has a high intensity (>13.5% of the peak, in this example), and an intermediate region, or fringe, bounded by the circles 502 and 404 where the light has a reduced, but still significant, intensity. Photo-sensors 216, 216' and 216" are placed in the fringe of the beam. Thus, the photo-sensors do not interfere with the high intensity region of the beam. Each photo-sensor is responsive to a different range of wavelengths. These wavelengths correspond to the wavelengths of one of the light sources, so each photo-sensor provides an electrical signal that can be used in a feedback loop to control one of the light sources. Further, a timing scheme may be used in which during a particular interval only one of the light source is activated. During this time interval, a measurement of the light intensity may be made at one of the sensors. In one embodiment, a single sensor 216 is used to provide feedback signals for all of the light sources.

Photo-sensor after scanner When the photo-sensor 218 is used, it is positioned at the edge of the beam region near the scanner (214 in FIG. 2). In one embodiment, the scanner and beam region are inside a micro-projector. The photo-sensor may be placed at a corner of the beam region in an area that is usually blanked out to avoid the 'pin cushion effect'. The dimension SC of the space in the beam region corresponding to the area available for the photo-sensor at a corner of the beam region is given by $$SC = d*\tan(a)*[(1+r^2\tan^2(a))^{1/2}-1] \quad (1)$$

where d is the distance from the scanner to the beam region, a is the maximum angle or rotation of the scanning mirror from the center line and r is the image aspect ratio.

The width of the beam region is W=2*d*tan(a) so the dimension of the available space is $$SCN = \frac{N}{2}\left[(1+r^2\tan^2(a))^{1/2}-1\right] \text{ pixels,} \quad (2)$$

where N is the width of the image in pixels.

In one exemplary embodiment, the beam region is located 10 mm in front of an SVGA scanner that generates an image of 800×600 pixels. The scanning angle is a=30° and the aspect ratio is r=600/800, so the dimension of the space available (given by equation 1) is 0.518 mm. Thus, a photo-sensor of dimension 0.5 mm×0.5 mm may be used. This is approximately 35 pixels at the pin cushion corner (from equation 2).

In order to allow an individual light source intensity to be measured, a timing scheme is used in which the light sources are modulated. In certain time intervals, only one light source is activated. The intensity of the activated light source can be monitored by the photo-sensor 218 during these intervals. Each light source is activated in turn, allowing the intensity of each of the light sources to be monitored. In this embodiment, the scanned beam is periodically directed onto the photo-sensor 218 at the edge of the beam region. This portion of the beam region is usually blanked out to avoid a 'pin-cushion' shaped image. A single sensor may be used, or a set of red, green and blue sensors. In certain time periods, full intensity light from a single light source is directed at the sensor.

A feedback control circuit is responsive to the photo-sensor output signals. The feedback control circuit may be synchronized with the light source timing scheme, so that intensity of each light source can be adjusted in turn in response to the appropriate photo-sensor signal.

An SVGA image comprises 800×600=480,000 pixels. At a 75 frames per second, the beam is at each pixel for an average of 28 ns. In one embodiment, the photo-sensor is a photo-diode. For example, a photo-diodes can have a response time in the region of 3 ns, so the photo-sensor can be scanned at the same rate as the rest of the image or treated as a single pixel. Further, controlled independent readings for one or more light sources can be made in a single scan.

In one embodiment, semi-conductor, diode or frequency-doubled lasers are used as light sources and Si-photodiodes are used as photo-sensors.

Conventional feedback electronics (not shown in FIG. 2) may be used adjust the light source intensity dependent upon the signal from the corresponding photo-sensor.

Figure 6:
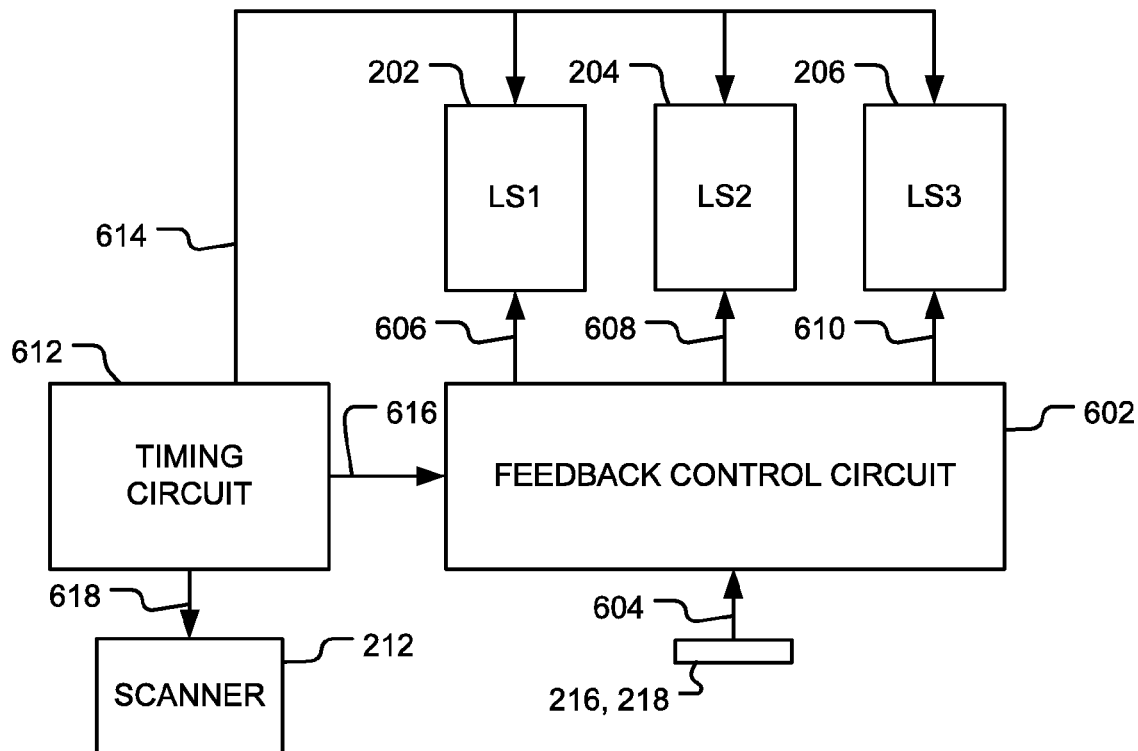
FIGS. 6, 7, and 8 are diagrams of illumination systems consistent with certain embodiments.

FIG. 6 is a diagram of an illumination system consistent with certain embodiments. The illumination system includes a first light source 202 for generating light at a first wavelength, a second light source 204 for generating light at a second wavelength and a third light source 206 for generating light at a third wavelength. The light sources are controlled by a feedback control circuit 602 that is responsive to photo-sensor 216 or 218. The photo-sensor produces a monitor signal 604. During an interval when the light source 202 is activated and the light sources 204 and 206 are not activated, the feedback control circuit 602 generates a control signal 606 to control the intensity of light source 202. Similarly, during an interval when of the three light source only the light source 204 is activated, the feedback control circuit 602 generates a control signal 608 to control the intensity of light source 204, and when only the light source 206 is activated, the feedback control circuit 602 generates a control signal 610 to control the intensity of light source 206.

A timing circuit 612 controls modulation of the light sources 202, 204 and 206 via signal 614, and controls the feedback control circuit 602 via signal 616. In operation, during a time interval when only one of the light sources is activated, the photo-sensor signal is monitored and is used to adjust the intensity of the activated light source. If the photo-sensor 218 is used, the timing circuit 612 also synchronizes the scanner 212 to direct the scanner output to the photo-sensor at the appropriate time using signal 618.

In one embodiment, the feedback control circuit comprises three independent control circuits, and sensor signals are passed to each circuit in turn.

Figure 7:
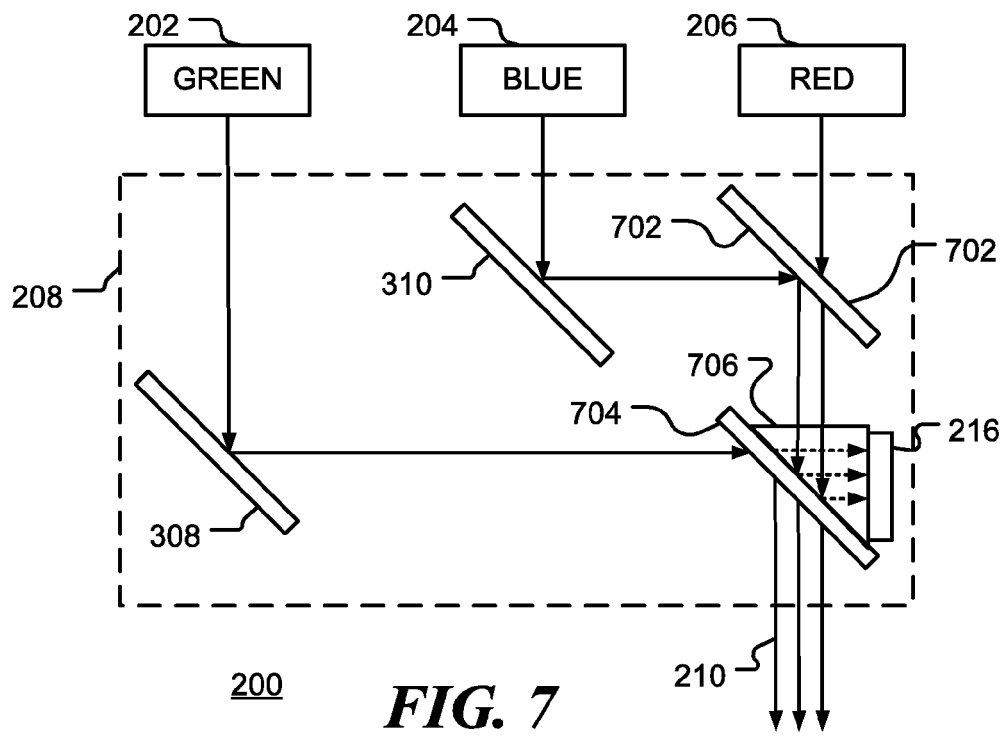

Single photo-sensor integrated with beam combiner. FIG. 7 is diagram of a multiple light source illumination system with intensity control consistent with certain embodiments.

Referring to FIG. 7, the system 200 includes three light sources 202, 204 and 206. These may be lasers, for example, each producing light at a primary color wavelength. For example lasers that generate light at 440 nm, 532 nm and 635 nm wavelengths may be used. Referring again to FIG. 7, the light sources 202, 204 and 206 emit light uni-directionally in three separate beams. The beams are combined into a collimated and co-linear beam 210 in beam combiner 208 using dichroic mirrors 308, 310, 702 and 704. Dichroic mirrors 308 and 704 reflect substantially all light from source 202, while dichroic mirrors 310 and 702 reflect substantially all light from the source 204. Mirrors 702 and 704 transmit substantially all light from source 206. Mirror 704 transmits substantially all light from source 206.

Photo-sensor 216 (such as a photo-diode or photo-transistor) is positioned behind dichroic mirror 704 and is oriented to detect transmitted green light and reflected red and blue light The intensity of the detected light is in direct proportion to the intensity of the primary light, so the output from the photo-sensor provides a signal for use in a feedback control loop to control the light source intensity.

More generally, dichroic mirrors are used to direct the light from a light source, either by transmitting or reflecting substantially all of the light at a certain narrow band. When the light is transmitted, the photo-sensor can be placed on the same side of the mirror as the light source so as to collect the small amount not transmitted and not to interfere with the main beam. When the light is reflected by the mirror, the photo-sensor can be placed on the opposite side of the mirror from the light source so as to collect the small amount not reflected and not to interfere with the main beam. In both case, the sensor is place to receive light that is not directed along the main beam. That is, if the main beam emanates from one side of the mirror, the sensor is place on the other side. It will be apparent to those of ordinary skill in the art that this approach can be used for other light directing means, such as prisms.

Optionally, a prism structure 706 may be used to provide a mechanical support for the photo-sensor 216 and dichroic mirror 704. That is, dichroic mirror 704 is mounted on one facet of prism structure 706, while photo-sensor 216 is mounted on another facet of the prism structure 706.

In a further embodiment, the dichroic mirror is formed as a coating on the surface of the prism structure 706.

The photo-sensor 216 receives light from all of the light sources. As described above, a timing scheme is used to allow independent monitoring of each of the light sources. In certain time intervals, only one light source is activated. Since it is known which light source is activated, the photo-sensor signal may be used in a feedback control circuit to adjust the corresponding light source.

For applications where full color is not required, the illumination system may use only two light sources. In FIG. 7, for example, any one of the light sources could be omitted. However, omitting light source 204 eliminates two dichroic mirrors. For full color applications, three or more light sources may be used.

The geometric arrangement shown in FIG. 7 makes efficient use of space, since the photo-sensor is positioned in space behind the dichroic mirror. This space would otherwise be unused. The use of a single sensor in combination with the timing scheme described above reduces the volume further.

The geometric arrangement results in improved efficiency compared to a system using back facet reflectivity (98% for mirrors versus 90% for back reflectivity). For example, for a red laser diode used with back monitoring, a typical back reflectivity at about 90% is used. If back monitoring is not needed, the back reflectivity can be 95% or higher, this makes the laser more efficient by decreasing the threshold current and increasing the slope efficiency.

Figure 8:
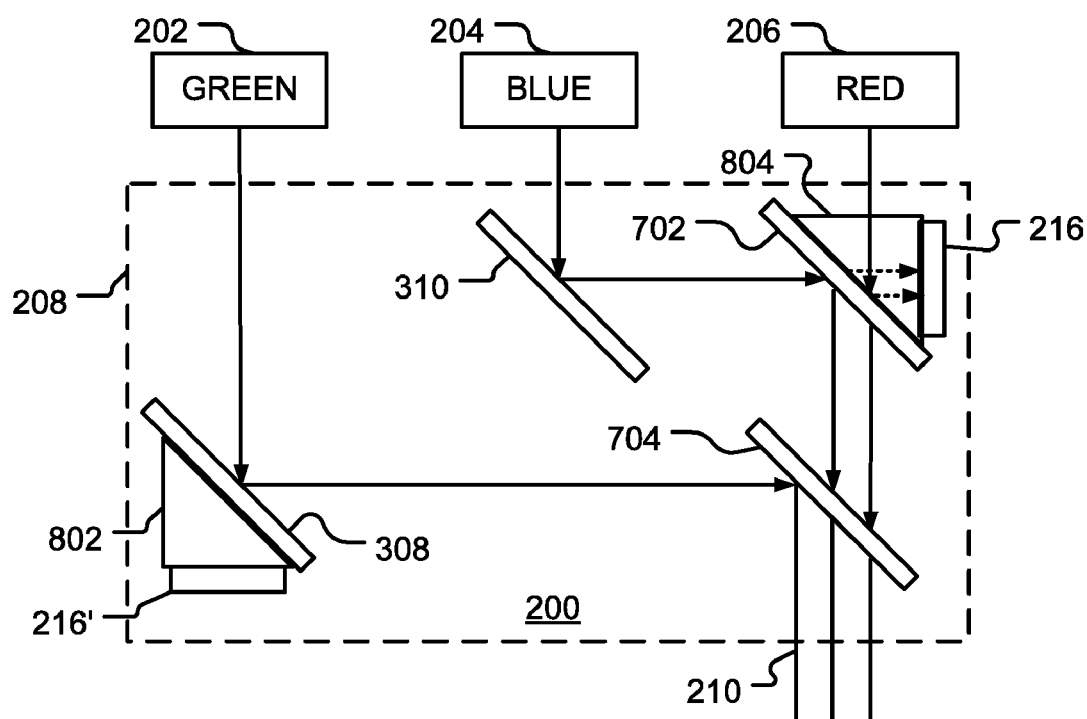

Dual photo-sensors integrated with beam combiner. FIG. 8 is a diagram of a multiple light source illumination system with intensity control consistent with certain embodiments. Referring to FIG. 8, the system 200 includes at least three light sources, 202, 204 and 206. The light sources emit light uni-directionally in three separate beams. The beams are combined into a collimated and co-linear beam 210 in beam combiner 208 using dichroic mirrors 308, 310, 702 and 704. Dichroic mirrors 308 and 704 reflect light from source 202, while dichroic mirrors 310 and 702 reflect light from the source 204. Mirrors 702 and 704 transmit light from source 206.

Photo-sensor 216' is positioned behind dichroic mirror 308 and is oriented to detect the transmitted light. Optionally, a prism structure 802 can be used to provide a mechanical support for the photo-sensor and associated dichroic mirror. The photo-sensor 216' provides an independent measure of light from light source 202. A second photo-sensor 216 receives light from light sources 204 and 206. As described above, a timing scheme is used to allow independent monitoring of each of the light sources. In certain time intervals, only one of the two light sources (either 204 or 206) is activated. Since it is known which light source is activated at a given time, the photo-sensor signal may be used in a feedback control circuit to adjust the appropriate light source.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. An illumination system comprising:
    a first light source operable to respond to a first feedback control circuit and generate light at a first wavelength;
    a second light source operable to respond to a second feedback control circuit and generate light at a second wavelength;
    a beam combiner operable to combine light from the first and second light sources and produce a substantially co-linear and collimated beam;
    a first photo-sensor operable to sense light from the first light source and the second light source to provide a signal to the first feedback control circuit, and
    a second photo-sensor operable to sense light from the first light source and the second light source to provide a signal to the second feedback control circuit,
    wherein the first photo-sensor is sensitive to light of the first wavelength and the second photo-sensor is sensitive to light of the second wavelength,
    wherein the beam combiner comprises a first dichroic mirror configured to receive light from the first light source and the second light source and produce the substantially co-linear and collimated beam from a first face of the first dichroic mirror, and wherein the first photo-sensor is positioned to receive light from a second face of the first dichroic mirror, and
    wherein the first dichroic mirror is located on a first facet of a prism structure and the first photo-sensor is positioned on a second facet of the prism structure.

2. An illumination system in accordance with claim 1, wherein the first and second light sources comprise lasers.

3. An illumination system in accordance with claim 1, further comprising:

a third light source operable to respond to a third feedback control circuit and generate light at a third wavelength; and
a second dichroic mirror operable to combine light from the second and third light sources before the first dichroic mirror;
a third photo-sensor, sensitive to light of the third wavelength and operable to sense light from the first, second and third light source to provide a signal to the third feedback control circuit.

4. An illumination system comprising:
a first light source operable to respond to a first feedback control circuit and generate light at a first wavelength;
a second light source operable to respond to a second feedback control circuit and generate light at a second wavelength;
a beam combiner operable to combine light from the first and second light sources and produce a substantially co-linear and collimated beam;
a timing circuit operable to activate only the first light source of the first and second light sources in a first time interval and to activate only the second light source of the first and second light sources in a second time interval; a first photo-sensor operable to sense light from the first light source and the second light source to provide a signal to the first feedback control circuit during the first time interval and to the second feedback circuit during the second time interval,
wherein the first photo-diode is located to sense light in a fringe of the substantially co-linear and collimated beam.

5. An illumination system in accordance with claim 1 further comprising a third light source operable to respond to a third feedback control circuit and generate light at a third wavelength, wherein:
the beam combiner is operable to combine light from the first, second and third light sources and produce a substantially co-linear and collimated beam; and
a third photo-sensor, sensitive to light of the third wavelength and operable to sense light from the first, second and third light source to provide a signal to the third feedback control circuit.

6. An illumination system comprising:
a first light source operable to respond to a first feedback control circuit and generate light at a first wavelength;
a second light source operable to respond to a second feedback control circuit and generate light at a second wavelength;
a beam combiner operable to combine light from the first and second light sources and produce a substantially co-linear and collimated beam;
a timing circuit operable to activate only the first light source of the first and second light sources in a first time interval and to activate only the second light source of the first and second light sources in a second time interval;
a first photo-sensor operable to sense light from the first light source and the second light source to provide a signal to the first feedback control circuit during the first time interval and to the second feedback circuit during the second time interval, and
a scanner operable to receive the substantially co-linear and collimated beam and scan it across a beam region close to the scanner, wherein the first photo-sensor is located at the periphery of the beam region, and wherein the scanner is further operable to project the substantially co-linear and collimated beam onto the first photo-sensor during the first time interval and the second time interval.

7. A portable electronic device comprising the illumination system of claim 6, wherein the scanner is further operable to produce a projected image.

8. A method for generating light from a plurality of light sources, the method comprising:
generating light of a first wavelength from a first light source of the plurality of light sources;
generating light of a second wavelength from a second light source of the plurality of light sources;
combining the light of the first wavelength and the light of the second wavelength to form a substantially co-linear and collimated beam;
sensing a combination of the light of the first wavelength and light of the second wavelength to produce a monitor signal;
controlling the first light source dependent upon the monitor signal in a first time interval; and
controlling the second light source dependent upon the monitor signal in a second time interval,
wherein sensing the combination of the light of the first and second wavelengths comprises sensing the sensing light in the fringe of the substantially co-linear and collimated beam using a first photo-sensor sensitive to the first wavelength and a second photo-sensor sensitive to the second wavelengths.

9. A method in accordance with claim 8, wherein combining the light of the first wavelength and the light of the second wavelength to form the substantially co-linear and collimated beam comprises:
reflecting the light of the first wavelength at a first surface of a dichroic mirror configured to transmit light of the second wavelength; and
directing the light of the second wavelength at a second surface of the dichroic mirror to produce the substantially co-linear and collimated beam from the first surface of the dichroic mirror; and
wherein sensing a combination of the light of the first wavelength and light of the second wavelength to produce a monitor signal comprises sensing light emanating from the second surface of the dichroic mirror.

10. A method in accordance with claim 8, further comprising passing the substantially co-linear and collimated beam to a scanner.

11. A method for generating light from a plurality of light sources, the method comprising:
generating a timing signal;
applying the timing signal to a first light source of the plurality of light sources to generate light of a first wavelength;
applying the timing signal to a second light source of the plurality of light sources to generate light of a second wavelength;
combining the light of the first wavelength and the light of the second wavelength to form a substantially co-linear and collimated beam;
sensing a combination of the light of the first wavelength and light of
the second wavelength to produce a monitor signal;
controlling the first light source dependent upon the monitor signal in a first time interval; and
controlling the second light source dependent upon the monitor signal in a second time interval,
wherein the second light source is not activated in the first time interval and the first light source is not activated in the second time interval, wherein sensing a combination of the light of the first wavelength and light of the second wavelength to produce a monitor signal comprises sensing light in a fringe of the substantially co-linear and collimated beam.

12. A method for generating light from a plurality of light sources, the method comprising:
generating a timing signal;
applying the timing signal to a first light source of the plurality of light sources to generate light of a first wavelength;
applying the timing signal to a second light source of the plurality of light sources to generate light of a second wavelength;
combining the light of the first wavelength and the light of the second wavelength to form a substantially co-linear and collimated beam;
sensing a combination of the light of the first wavelength and light of
the second wavelength to produce a monitor signal;
controlling the first light source dependent upon the monitor signal in a first time interval;
controlling the second light source dependent upon the monitor signal in a second time interval;
generating light of a third wavelength from a third light source of the plurality of light sources; and
combining the light of the third wavelength with light of the first and second wavelengths to form the substantially co-linear and collimated beam, wherein the second light source is not activated in the first time interval and the first light source is not activated in the second time interval, and wherein sensing a combination of the light of the first, second and third wavelengths comprises sensing the sensing light in the fringe of the substantially co-linear and collimated beam using a first photo-sensor sensitive to the first wavelength, a second photo-sensor sensitive to the second wavelengths and a third photo-sensor sensitive to the third wavelength.

13. An illumination system comprising:
a plurality of light generating means;
a timing means for modulating the plurality of light generating means;
a beam combining means for combining light from the plurality of light generating means to produce a combined beam;
a light sensing means for sensing light generated by at least one of the plurality light generating means and producing a monitor signal; and
a feedback control means, for controlling a first light generating means of the plurality of light generating means in response to the monitor signal in a first time interval,
wherein only the first light generating means of the plurality of light generating means is activated during the first time interval,
wherein the light sensing means is located in a fringe of the combined beam.

14. An illumination system in accordance with claim 13, further comprising a scanning means for receiving the combined beam and scanning it across a beam region close to the scanner, wherein the light sensing means is located at a corner of the beam region.

15. An illumination system in accordance with claim 13, wherein the scanning means is responsive to the timing means and operable to direct the combined beam at the light sensing means during the first time interval.

* * * * *